(No Model.) 6 Sheets—Sheet 1.
L. M. R. DAUDETEAU & M. DARMANCIER.
MECHANISM FOR BREECH LOADING GUNS.

No. 426,779. Patented Apr. 29, 1890.

WITNESSES:
George Baumann
John Revell

INVENTOR
Louis M. R. Daudeteau and
Michel Darmancier
BY
Howson and Howson
their ATTORNEYS (No Model.) 6 Sheets—Sheet 3.
L. M. R. DAUDETEAU & M. DARMANCIER.
MECHANISM FOR BREECH LOADING GUNS.

No. 426,779. Patented Apr. 29, 1890.

WITNESSES:
George Baumann
John Revell

INVENTOR
Louis M. R. Daudeteau, and
Michel Darmancier
BY
Howson and Howson
their ATTORNEYS (No Model.) 6 Sheets—Sheet 5.
L. M. R. DAUDETEAU & M. DARMANCIER.
MECHANISM FOR BREECH LOADING GUNS.

No. 426,779. Patented Apr. 29, 1890.

WITNESSES:
George Baumann
John Revell

INVENTOR
Louis M. R. Daudeteau &
Michel Darmancier
BY
Howson and Howson
their ATTORNEYS (No Model.) 6 Sheets—Sheet 6.
L. M. R. DAUDETEAU & M. DARMANCIER.
MECHANISM FOR BREECH LOADING GUNS.
No. 426,779. Patented Apr. 29, 1890.
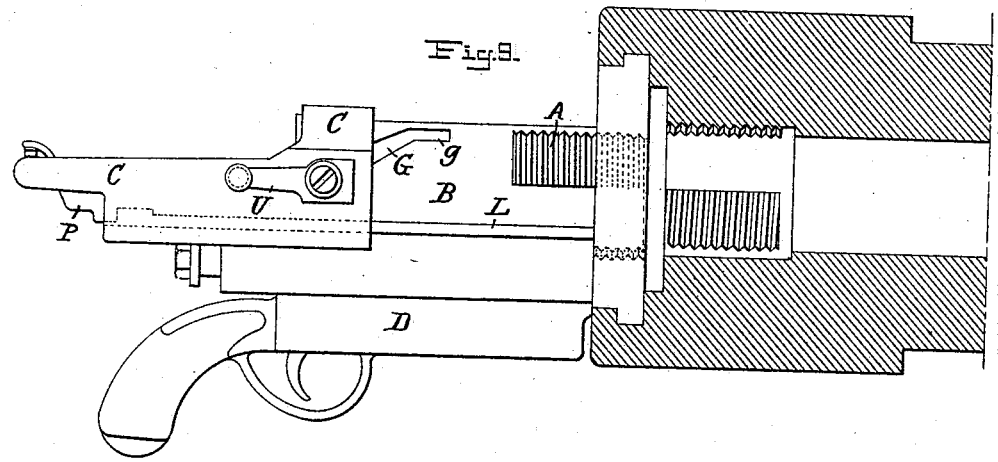
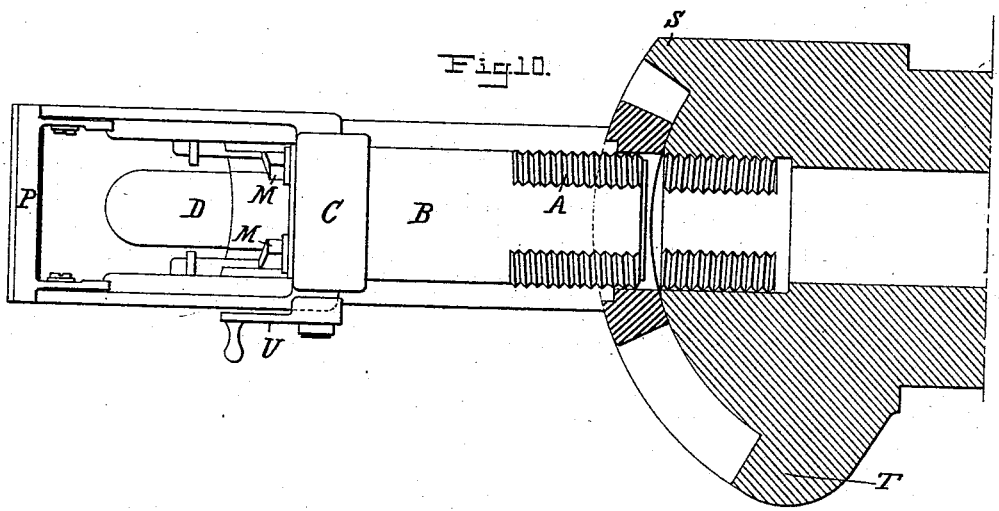
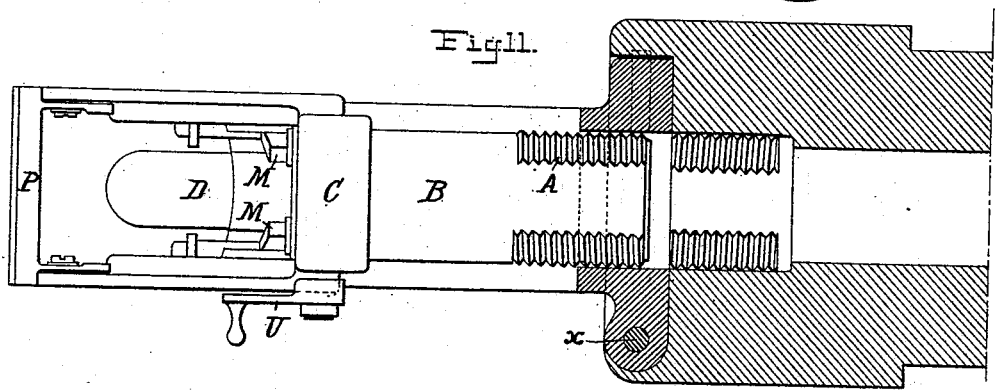
WITNESSES:
E. J. Griswold
George Baumann
INVENTOR
Louis M. R. Daudeteau, and
Michel Darmancier
BY
Howson and Howson
their ATTORNEYS

UNITED STATES PATENT OFFICE.

LOUIS MARIE RENÉ DAUDETEAU, OF VANNES, AND MICHEL DARMANCIER, OF SAINT-CHAMOND, FRANCE.

MECHANISM FOR BREECH-LOADING GUNS.

SPECIFICATION forming part of Letters Patent No. 426,779, dated April 29, 1890.

Application filed June 5, 1889. Serial No. 313,162. (No model.)

*To all whom it may concern:*

Be it known that we, LOUIS MARIE RENÉ DAUDETEAU, of Vannes, (Morbihan,) and MICHEL DARMANCIER, of Saint-Chamond, (Loire,) in the Republic of France, have invented a Rapid and Safe Mechanism for Closing the Breeches of Guns of any Caliber, of which the following is a specification.

This invention relates to a rapid and safe mechanism for closing the breeches of guns of any caliber, such as quick-firing guns, field-guns, and other guns of mean or large caliber. This breech-closing mechanism, in its general combination, is illustrated in the accompanying drawings, which represent, by way of example, the application of the invention to a quick-firing gun of forty-seven millimeters.

We will now proceed to describe the invention, referring to the accompanying drawings, in which—

Figure 1:
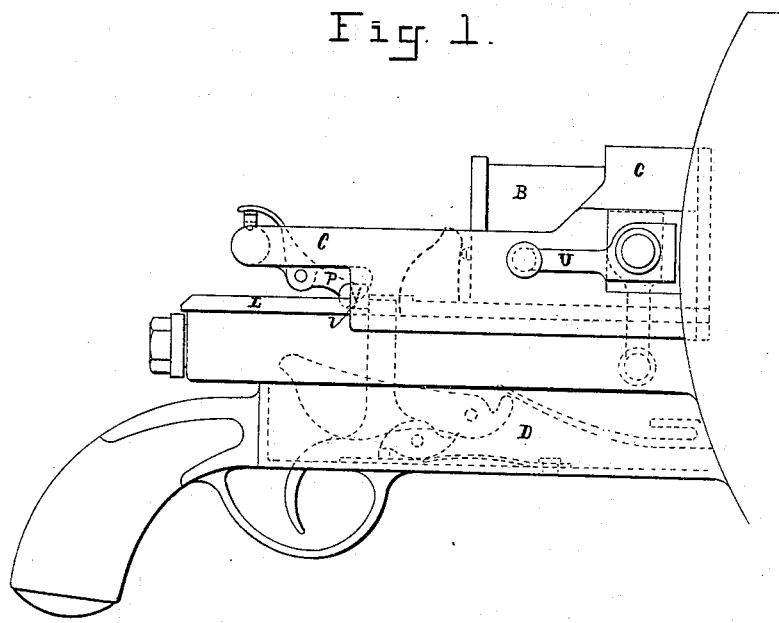
Figure 2:
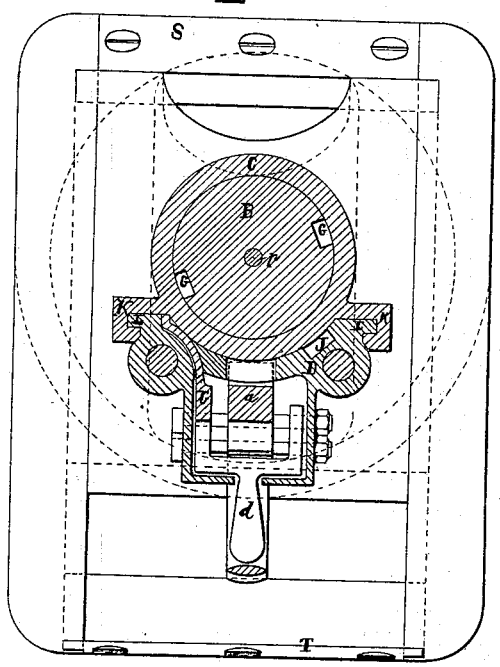
Figure 3:
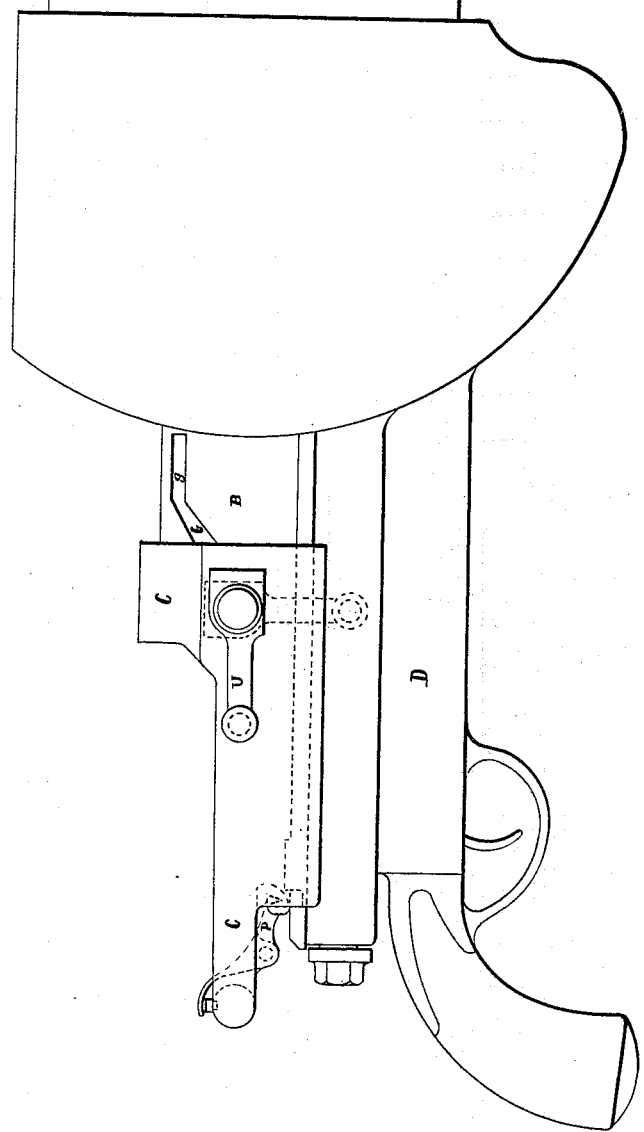
Figure 4:
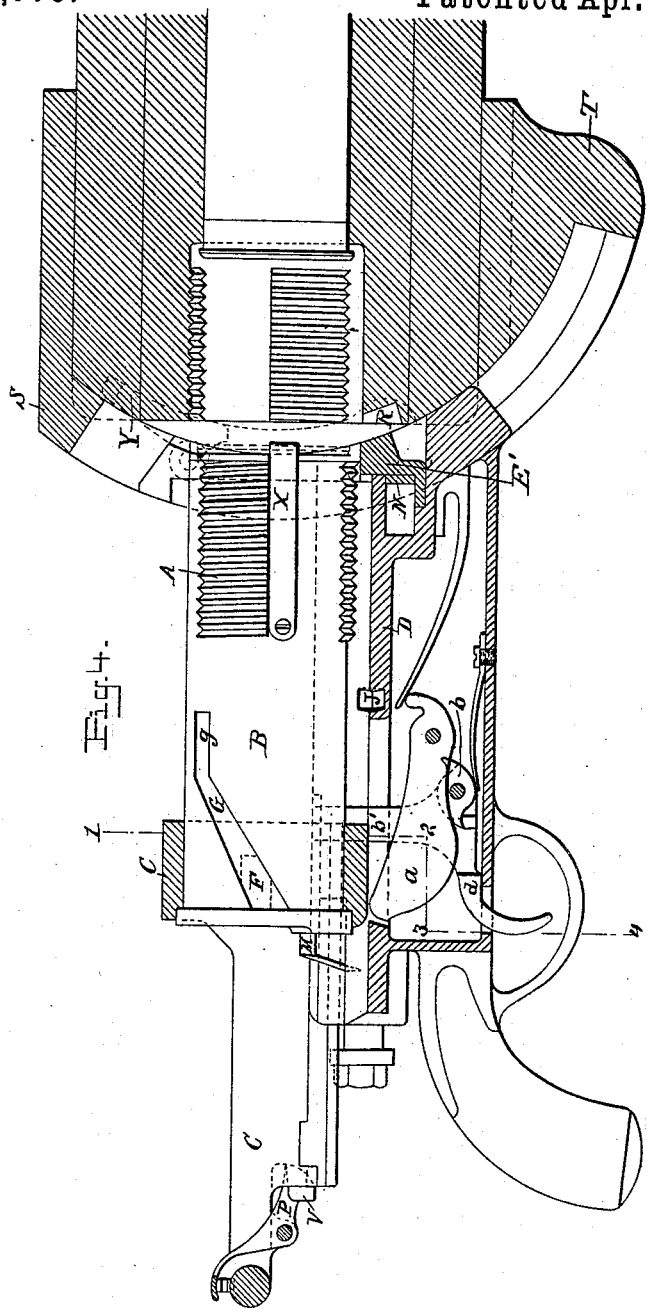
Figure 5:
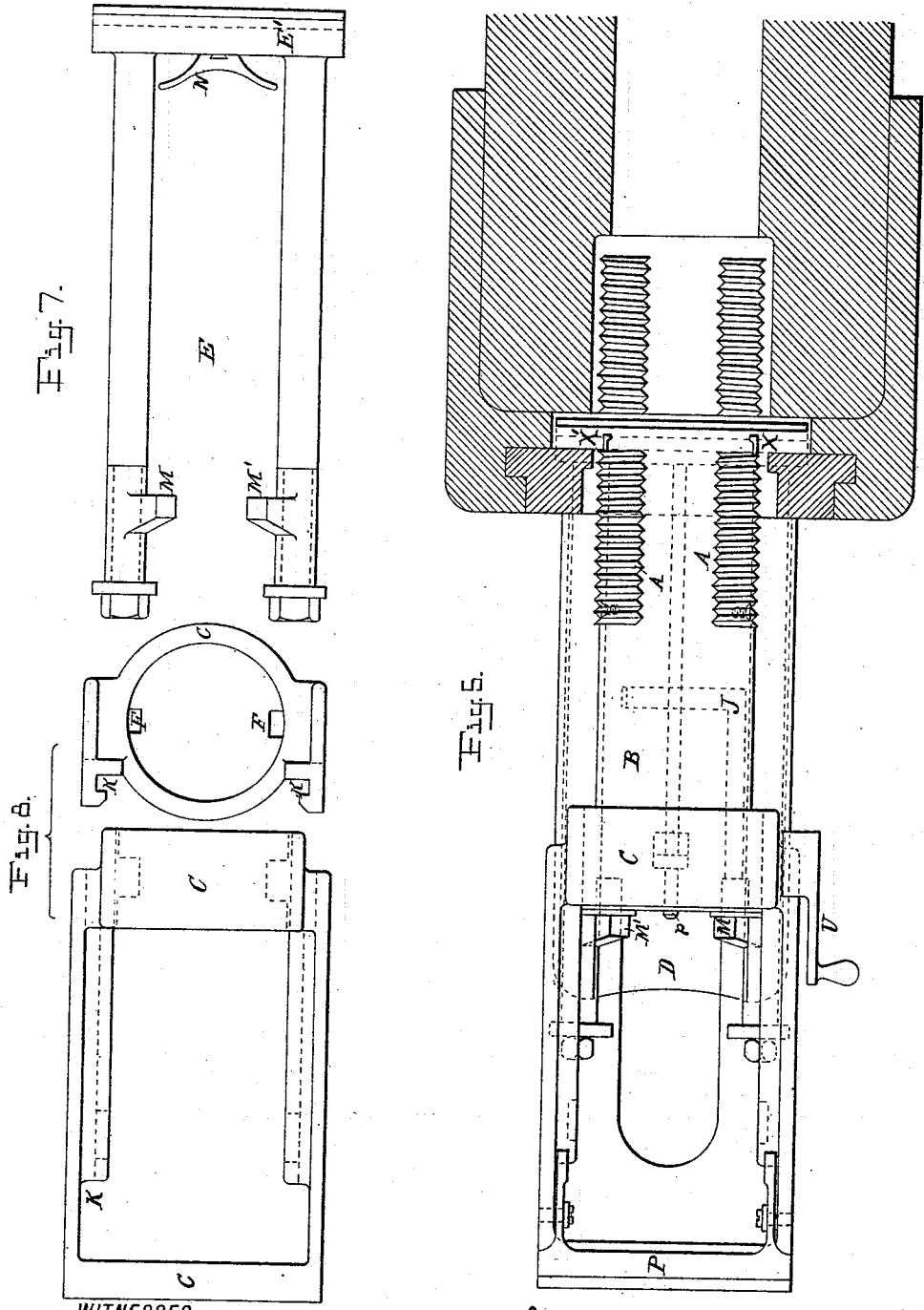
Figure 6:
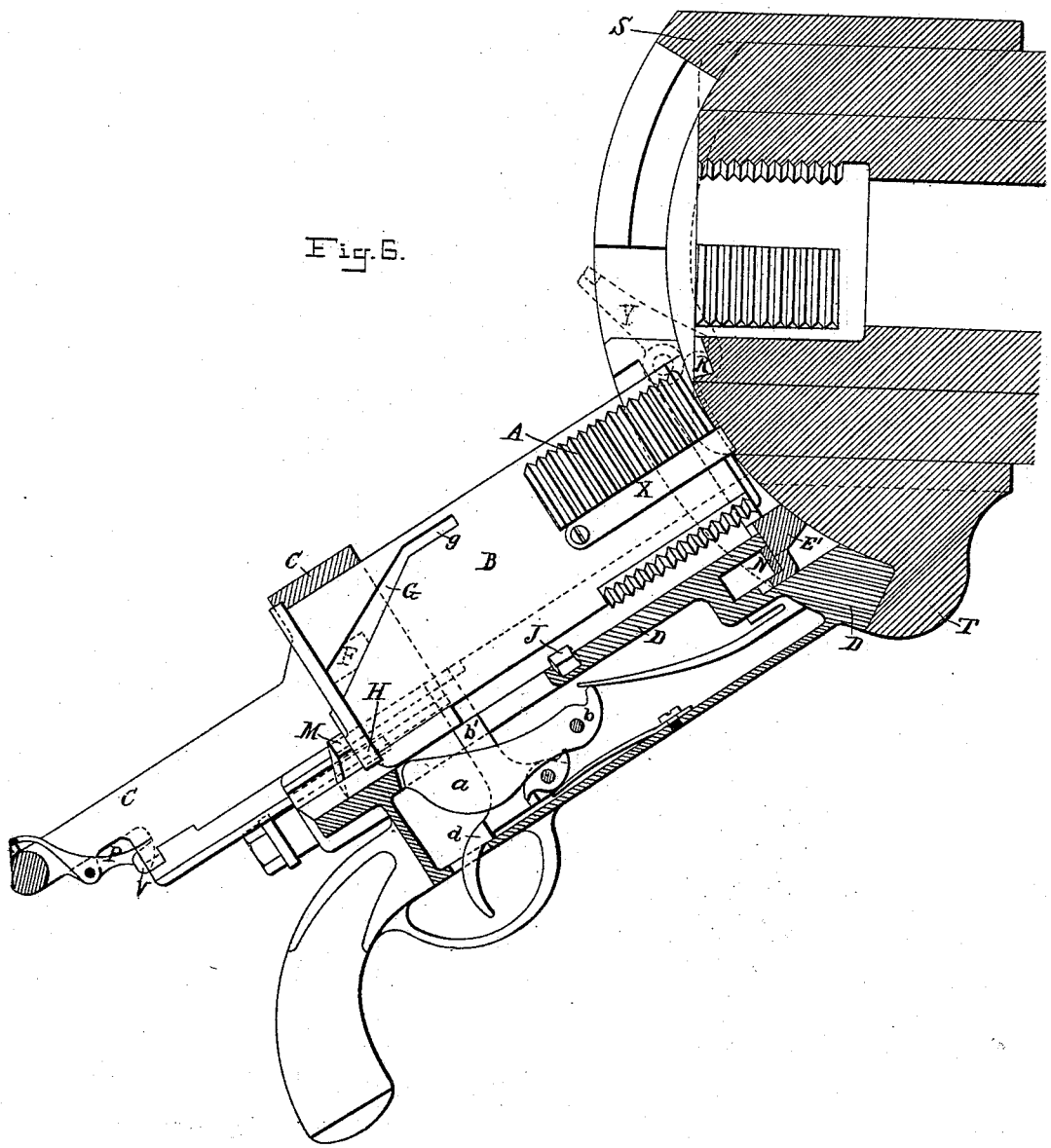

Figure 1 represents the breech of the gun closed in the position for firing. Fig. 2 represents a transverse section taken through the breech mechanism in the closed position on the lines 1 2 3 4, Fig. 4. Fig. 3 illustrates the breech-screw disengaged from the screw-threads in the breech and ready to be drawn back behind the face of the breech. Fig. 4 shows the breech-screw drawn back. Fig. 5 is a plan showing the parts in the same position. Fig. 6 shows the breech mechanism depressed, exposing the breech-chamber for the introduction of the charge. Figs. 7 and 8 are detail views. Figs. 9, 10, and 11 illustrate modifications.

The improved construction of breech mechanism is composed of the following principal elements, namely:

First. A cylinder A B, provided at its forward end with interrupted screw-threads A and presenting on its rear cylindrical portion B two helical or inclined grooves G, of suitable form for producing the one-sixth of a revolution required to be imparted to the screw in opening or closing the breech, as hereinafter explained:

Second. A ring C, provided with a handle and embracing the cylindrical part of the breech-screw.

Third. A support or bracket D in the form of a trough or tile and acting as a guide for the ring C and the breech-screw. This bracket is capable of sliding in two circular grooves formed in the face of the breech, so as to admit of being elevated or depressed relatively to the axis of the gun. It is not absolutely necessary to adopt this particular arrangement, as the breech-screw may be arranged to slide in a support opening laterally or in a hinged support capable of being swung to one side, for example, according to the nature of the gun to which the invention is applied.

Fourth. A bracket-locking bolt E, Fig. 7, provided with a head E' and two projections M M'.

Fifth. A firing or percussion mechanism composed of a hammer *a*, a jointed or pivoted sear *b b'*, and a trigger *d*. This apparatus is contained in a hollow in the bracket D, which is provided at the rear with a trigger-guard and terminates in a pistol grip or handle.

Studs F, fixed on the hand-ring C, Figs. 4 and 8, work in the helical grooves G, formed in the extension or cylindrical part of the breech-block B. The effect of this arrangement is that when the gunner pushes forward or pulls back the hand-ring C he imparts a rotary motion to the breech-block B and causes the interrupted threads of the breech-screw to engage with or be disengaged from the corresponding threads in the breech, the path followed by the studs F in the helical grooves G corresponding to exactly one-sixth of a revolution. When the gunner, having thus freed the screw-threads of the breech-screw, continues to draw the hand-ring toward himself, the studs F at the end of their stroke bearing against the ends of the grooves, Figs. 4 and 6, draw back the breech-screw also, which, when pulled out onto the bracket D, is stopped in its backward movement at the moment when it is completely drawn out of the breech of the gun.

A projection H slides in a groove J, Figs. 2, 4, 5, and 6, formed in the thickness of the bracket D. Two parallel ribs L on the bracket D act as guides, which work in corresponding recesses in ribs K, formed on the hand-ring C, Figs. 1 and 2, and control the displacement of the said ring on the said bracket.

The two projections M M', Figs. 4, 5, 6, and 7, are formed on the bolt E, working in a recess in the thickness of the bracket, and a spring N constantly tends to push the said bolt in the direction of the breech.

The handle on the ring C is locked to the bracket by means of a locking device P on the handle, which, when the breech is completely closed, engages with a recess $l$ in the bracket, Fig. 1, for the purpose of rigidly connecting the ring to the bracket when the breech is completely closed.

The helical grooves in the cylinder of the breech-screw extend forward in the form of horizontal grooves $g$, which enable the ring to be shifted farther forward after the breech-screw has completed the one-sixth of a revolution, as hereinbefore described.

A central hole, Figs. 2 and 5, is bored out in the breech-screw from end to end for the reception of a firing-pin $p$, which transmits to the cap of the cartridge in the breech-chamber the shock of the blow delivered by the hammer. In place of this firing-pin a match acting by friction or any other suitable firing device may be employed.

*Action of the mechanism—Manipulation of the breech action.*—The breech end of the gun-barrel being closed, the gunner takes hold of the handle on the ring C with his right hand and draws it toward himself. The breech-screw first rotates, describing a fraction of a revolution on its axis, Fig. 3, and is then drawn back, Fig. 4, until it comes in contact with the projections M M' on the locking-bolt of the bracket. This bolt yields to the sudden pressure and disengages the head E' from its recess R. The breech-block, which is now drawn out and rests entirely on the bracket, can then be depressed along with the latter, which slides down the curved or circular guide-grooves provided at the breech end of the barrel. These guide-grooves are provided with an upper stop S, which limits the movement of bracket in ascending, and with a lower stop T, which limits the descending movement in a vertical plane, Fig. 6, so that when the bracket is brought in contact with the upper stop the axis of the breech-screw coincides with that of the barrel, and when it is in contact with the lower stop the screw-threaded opening of the breech-chamber is completely exposed for the introduction of the charge or cartridge. The breech being thus completely open, the gunner introduces the charge or cartridge with his left hand into the breech-chamber, and then, with his right hand still grasping the handle on the ring C, he elevates the bracket D until it comes in contact with the upper stop. At this moment the head E' of the bolt E, under the pressure of the spring N, locks the bracket in position, and the gunner then pushes forward the handle on the ring in a straight line until its movement is arrested by the stop. The breech-screw is thus first moved forward, and, second, screwed into the breech. The catch P, locking the handle, is engaged with the recess $l$ and the gun is ready for firing.

*Firing.*—To discharge the gun, the marksman acts upon the tail of the trigger in the trigger-guard on the pistol-grip, or, if he desires to fire more rapidly, after turning forward an eccentric or cam lever U, connected with the rapid-firing action, Figs. 1, 3, and 5, he simply pushes the handle on the ring to the end of its stroke, and under these conditions this act causes a projection V, connected to the ring, to act on an arm $b'$ on the sear, so as to disengage the nose of the sear $b$ from the bent or notch in the hammer or tumbler $a$, and thus discharge the gun automatically.

*Cocking the hammer and extracting the empty cartridge-case.*—The act of drawing back the handle cocks the hammer by the action of the breech-block, and the two extractors X X'—one on each side of the breech—pull out the empty case as far as the face of the breech, and then release it; but the ejector Y in descending jerks it out with a force corresponding to the sharpness with which its tail comes in contact with the bracket.

*Safety.*—It is impossible for the gun to be discharged before the breech is completely closed by the screwed breech-block for the following reasons, namely: First, because, until this closing has been effected the hammer cannot be released by the trigger, (sear-notch;) second, because the firing-pin cannot move forward until after the closing movement is completed.

*Special arrangement.*—The arrangement which has been hereinbefore described and the action explained may be combined with a slide or hinged bracket. It will be readily understood that in place of being depressed, as hereinbefore described, the breech-block, when disengaged from the breech by means of the hand-ring, may be moved away from the breech by carrying it to the right or to the left, either by a sliding movement, Figs. 9 and 10, or by swinging on a hinge $x$, Fig. 11, with any movement enabling the opening of the breech to be exposed, so as to admit of the introduction of the cartridge.

We claim—

1. In a gun of any caliber, the combination of the breech the bore of which is provided with interrupted screw-threads with a breech-block provided with interrupted screw-threads and helical grooves, a ring free to move in a straight line and provided with projections or studs engaging in the helical grooves to produce the rotary movement of the breech-block, and a support for the ring, as and for the purposes set forth.

2. In guns of any caliber, the combination of a breech the bore of which is provided with interrupted screw-threads with a breech-block provided with interrupted screw-threads adapted to engage with the screw-threads in the bore of the breech and helical grooves, a ring provided with studs to engage in the helical grooves, and a movable support to guide the ring and the breech-block to cover and uncover the opening of the breech and provided with a locking-bolt, substantially as and for the purpose set forth.

3. In guns of any caliber, the combination of a breech with a breech-block, a ring to move the breech-block, and a support for the ring and breech-block with a firing mechanism consisting of a central firing-pin in the breech, a hammer to act on the firing-pin, a sear with a movable nose, and a trigger, substantially as and for the purposes set forth.

4. In guns of any caliber, the combination of a breech with a breech-block provided with helical grooves having horizontal extensions, a ring provided with studs to engage in the helical grooves, a support for the ring-block, an eccentric or cam lever to allow a supplementary movement of the ring, and an automatic quick-firing mechanism, substantially as set forth.

5. In guns of any caliber, the combination of a breech the bore of which is provided with interrupted screw-threads with a breech-block provided with interrupted screw-threads and grooves, a movable ring provided with studs to engage in the grooves, a movable support provided with a locking-bolt, a central firing-pin, a hammer, a sear provided with an arm and a movable nose, a trigger, a cam-lever, and a projection on the ring to act on the arm of the sear, substantially as set forth.

In testimony whereof we have signed our names to this specification in the presence of two subscribing witnesses.

LOUIS MARIE RENÉ DAUDETEAU.
    MICHEL DARMANCIER.

Witnesses:
 FRANCOIS-XAVIER BACQUA,
 ADREN COLSON.